(12) United States Patent
Rangarajan et al.

(10) Patent No.: US 12,207,584 B2
(45) Date of Patent: Jan. 28, 2025

(54) POWER TAKE-OFF (PTO) CONNECTION MECHANISM FOR MID MOUNTED TOOLS OF A UTILITY VEHICLE

(71) Applicant: Mahindra and Mahindra Limited, Tamil Nadu (IN)

(72) Inventors: Sundararajan Rangarajan, Maharashtra (IN); Samu Sandberg, Pori (FI); Juho Ryyppö, Pori (FI); Hannu Rantala, Pori (FI)

(73) Assignee: Mahindra and Mahindra Limited, Nadu (IN)

( * ) Notice: Subject to any disclaimer, the term of this patent is extended or adjusted under 35 U.S.C. 154(b) by 727 days.

(21) Appl. No.: 17/448,805

(22) Filed: Sep. 24, 2021

(65) Prior Publication Data

US 2023/0031811 A1    Feb. 2, 2023

(30) Foreign Application Priority Data

Aug. 2, 2021    (IN) .............................. 202141034723

(51) Int. Cl.
*A01D 34/74*    (2006.01)
*A01B 71/06*    (2006.01)
*A01D 34/64*    (2006.01)
*A01D 69/00*    (2006.01)

(52) U.S. Cl.
CPC ............ *A01B 71/063* (2013.01); *A01D 34/64* (2013.01); *A01D 69/002* (2013.01)

(58) Field of Classification Search
CPC ..... A01B 71/063; A01B 71/06; A01B 63/104; A01D 34/64; A01D 69/002
See application file for complete search history.

(56) References Cited

U.S. PATENT DOCUMENTS

| 3,961,677 | A * | 6/1976 | Geisthoff | ............... B60K 25/02 180/14.4 |
| 7,877,972 | B2 * | 2/2011 | Fox | ........................ A01D 34/64 56/15.6 |
| 9,622,406 | B2 * | 4/2017 | Tada | .................... A01D 67/005 |

FOREIGN PATENT DOCUMENTS

CN    111343850 A    6/2020

\* cited by examiner

*Primary Examiner* — Thomas B Will
*Assistant Examiner* — Robert E Pezzuto
(74) *Attorney, Agent, or Firm* — Lathrop GPM LLP; Wm. Tucker Griffith

(57) ABSTRACT

A power take-off (PTO) connection mechanism for mid mounted tools of a utility vehicle includes three main assembly members: a frame attachment mechanism, a vertical moving frame (or cradle), and a PTO assembly. The frame attachment mechanism is fixed to the frame of the vehicle or tractor. The PTO connection mechanism helps in easy and quick connection of the PTO shaft to a variety of tools with the tractor. The PTO shaft remains in continuous contact with the tool power input once it is moved in an engaged position.

11 Claims, 14 Drawing Sheets

POWER TAKE-OFF (PTO) CONNECTION MECHANISM FOR MID MOUNTED TOOLS OF A UTILITY VEHICLE

CROSS REFERENCE TO RELATED APPLICATIONS

This application claims priority to Indian application number 202141034723, filed on Aug. 2, 2021, the disclosure of which is incorporated by reference herein in its entirety.

FIELD

The present disclosure relates to the field of mechanism of attaching work tools utility vehicles. More particularly, present disclosure relates to mechanisms for enabling PTO connection for mid mounted tools for tractors or utility vehicles.

BACKGROUND

The background information herein below relates to the present disclosure but is not necessarily prior art.

Typically, tractors and utility vehicles use different kind of tools for agricultural work and lawn care. A PTO shaft is an integral part of such tools wherein the PTO shaft transfers the power from the vehicle to the tool. Such tools are mounted under the tractor frame or utility vehicle frame between the front and rear tires. More particularly, these tools are attached to the frame of a tractor or other vehicle with mechanical linkages that allow the tool to be carried along with the vehicle. Connecting a PTO drive for different tools in a specific position can be a tough task. The conventional methods and mechanisms for connecting a PTO shaft between the tool and the vehicle (tractor) is tedious, cumbersome, time consuming and require efforts. There is a need of a mechanism that will ease the PTO engagement and disengagement for various tools in different configurations with respect to the utility vehicle.

Therefore, there is a need of a power take-off PTO connection mechanism for mid mounted tools of a utility vehicle, which alleviates the aforementioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a power take-off (PTO) connection mechanism for mid mounted tools of a utility vehicle.

An object of the present disclosure is to provide a power take-off (PTO) connection mechanism for mid mounted tools that automates the process of connection of the tool with the PTO shaft.

Another object of the present disclosure is to provide a PTO connection mechanism for mid mounted tools that enables easy coupling and decoupling of a tool to and from the frame of a utility vehicle.

Yet another object of the present disclosure is to provide a PTO connection mechanism that eases the PTO engagement and disengagement for the tools in different operative positions.

Other objects and advantages of the present disclosure will be more apparent from the following description when read in conjunction with the accompanying figures, which are not intended to limit the scope of the present disclosure.

SUMMARY

The present disclosure envisages a power take-off (PTO) connection mechanism for mid mounted tools of a utility vehicle. The power take-off (PTO) connection mechanism includes a power take-off PTO assembly connected to a movable cradle. The cradle is configured to raise and lower the tool with respect to vehicle frame. A PTO frame is configured to receive a bearing which is further configured to receive a PTO shaft. The PTO shaft is capable of sliding along the axis of the bearing in accordance with the upward and downward movement of the cradle. An intermediate sliding member is provided on a rear rod of the cradle. The intermediate sliding member extends in a direction parallel to the side links of the cradle.

Sliding blocks provided on the sides of the PTO frame. The sliding blocks are configured to slide along sliding surfaces defined on the side link and the intermediate sliding member of the cradle. A PTO coupler is coupled at the operative front end of the PTO shaft.

In an embodiment, a PTO locking mechanism is provided for preventing the backward movement of the sliding block after the PTO coupler gets engaged with PTO coupler of the tool.

In an embodiment, the power take-off PTO connection mechanism includes a push-pull rod connected between the PTO frame and a fixed position for rod assembly mounting defined on the frame attachment mechanism. The push-pull rod is configured to push the PTO frame forward such as to make the PTO frame slide along the sliding surfaces when the cradle is lifted up, and to apply a pull force on the PTO frame when the cradle is lowered.

In an embodiment, a push/pull spring assembly is configured to be pivotably coupled with the PTO frame. The cradle includes a PTO locking mechanism that includes a restriction plate, a compression spring and a release lever, said compression spring configured to push the restriction plate towards the intermediate sliding member.

In an embodiment, the restriction plate is configured to abut the operative rear end of the left side sliding block to restrict its rearward movement, when the cradle is lifted up to a predetermined position and when the PTO is engaged.

In an embodiment, the power take-off PTO connection mechanism includes a release lever connected to the restriction plate. The release lever is capable of pulling the restriction plate away from the intermediate sliding member and the left side sliding block to allow the rearward movement of the PTO frame and de-coupling of the tractor side PTO coupler from the tool side PTO coupler.

In an embodiment, the release lever is configured to be manually operated while disengaging the tool from the utility vehicle.

In an embodiment, the coupling between the cradle and the frame attachment mechanism is a joint coupling including a plurality of pivot joints defined by pins.

In an embodiment, grooves are defined in each of the sliding blocks. These grooves co-operate with sliding surfaces to enable linear motion of the PTO frame.

In an embodiment, a mechanism is provided for converting the vertical movement of the cradle to a horizontal (forward/backward) movement of PTO engagement and dis-engagement.

In an embodiment, a push-pull spring assembly provides the force for engagement through centering springs, to offer some flexibility of PTO engagement initially when the coupler is not engaged properly. Once the PTO is engaged and locked, the push/pull spring assembly is configured to a pulling force when the tool is lowered.

In an embodiment, fork-head side centering spring is compressed upon lowering of tool and after the release lever is actuated in a lowered position of tool. The PTO will disengage with the pull force of push/pull spring assembly.

In an embodiment, a support bracket is fastened at the operative front end of the intermediate sliding member. The support bracket is configured to prevent the sliding blocks of PTO assembly from coming out of the intermediate sliding member.

BRIEF DESCRIPTION OF THE ACCOMPANYING DRAWINGS

A power take-off PTO connection mechanism for mid mounted tools of a utility vehicle will now be described with the help of the accompanying drawing, in which.

LIST OF REFERENCE NUMERALS

Figure 1:
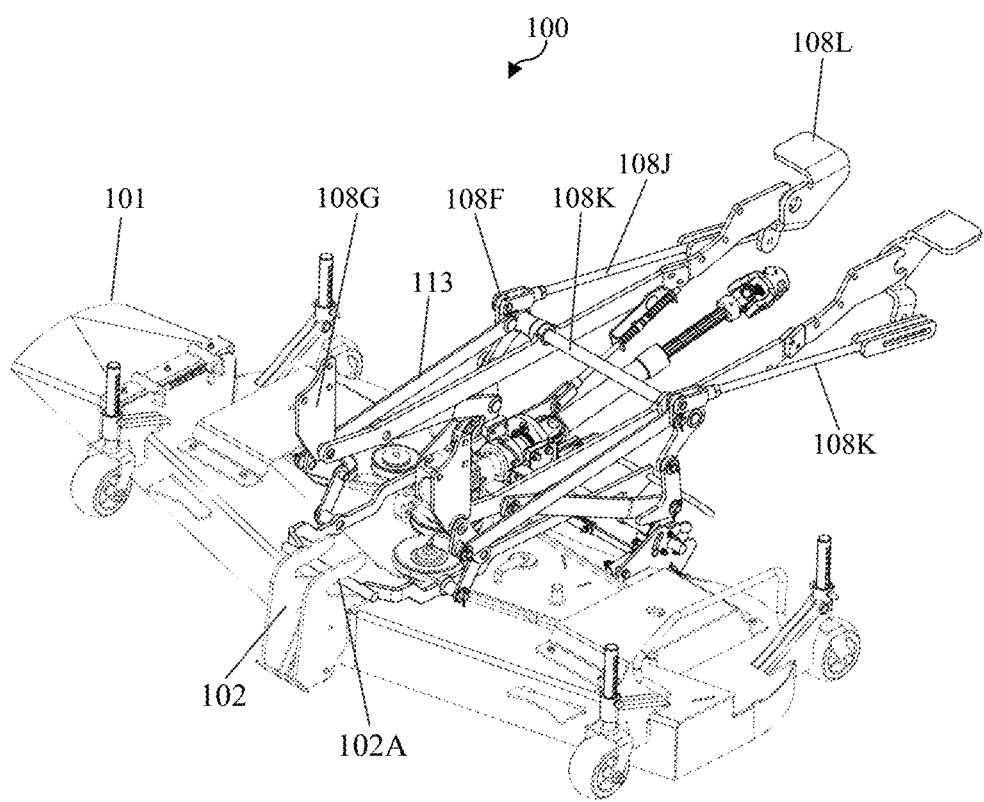
FIG. 1 illustrates an isometric view of a power take-off PTO connection mechanism for mid mounted tools of a utility vehicle.
Figure 2:
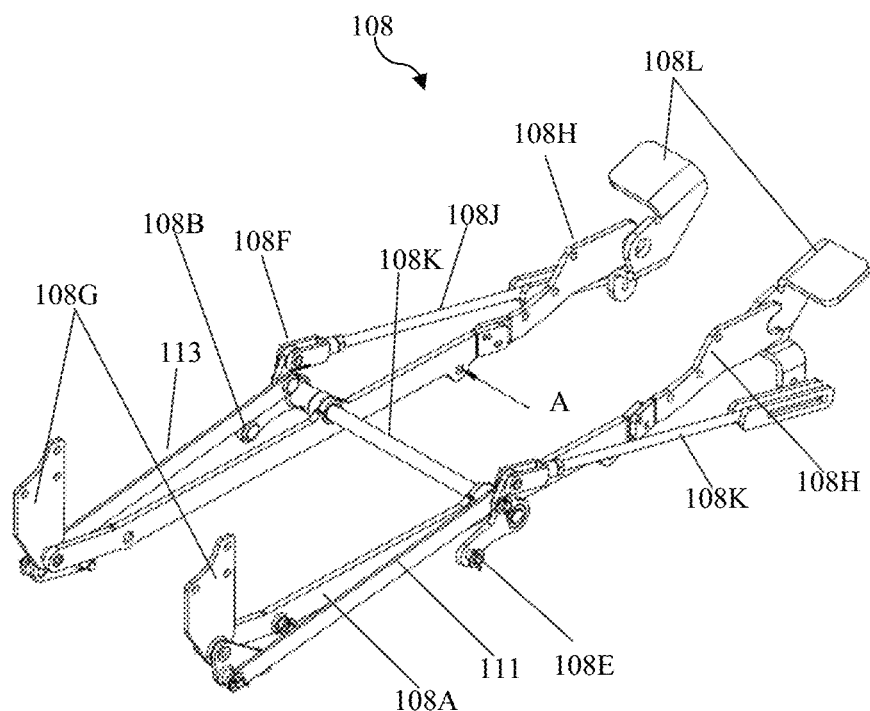
FIG. 2 illustrates an isometric view of a frame attachment mechanism.

1000—Utility vehicle (Tractor)
100—Power take-off (PTO) connection mechanism
A—Fixed position for rod assembly mounting
B—Sliding surfaces
101—Tool/Mower deck
102A—Front hooks
103a, 103b—Pair of side links of cradle
103c—Intermediate sliding member
104D—Rotational locking plates
106—Cradle (i.e. vertical moving frame)
106A—First horizontal rod
106B—Second horizontal rod
106C—Pair of front lifting members
106D—Pair of rear lifting members
108—Frame attachment mechanism
108A—Pair of first carrier links
108B—Pair of second carrier links
108E—First main lever
108F—Second main lever
108G—Front brackets
108H—Rear brackets
108J—First pull rod
108K—Second pull rod
108L—Turning brackets
111, 113—Intermediate pull rods
121—PTO locking mechanism
124—Restriction plate
126—Removable support bracket
128—Power take-off (PTO) assembly
128a—Centering spring
128b—Push/Pull rod
128c—Locked sleeve
128e—PTO frame
134—Compression spring
136—Release lever
140—Housing
142—Bearing
144—PTO shaft
146—PTO coupler
148—Push/pull spring assembly
150a, 150b—Sliding block of PTO assembly
152—Cover plate
156—Tool side PTO coupler

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an", and "the" may be intended to include the plural forms as well, unless the context clearly suggests otherwise. The terms "including," and "having," are open ended transitional phrases and therefore specify the presence of stated features, integers, steps, operations, elements and/or components, but do not forbid the presence or addition of one or more other features, integers, steps, operations, elements, components, and/or groups thereof.

The present disclosure envisages a PTO connection mechanism 100 for enabling faster attachment and disengagement of a tool 101 with frame of a utility vehicle 1000. The PTO connection mechanism 100 (herein after referred to as "PTO connection mechanism 100") is now described with reference to FIG. 1 through FIG. 14.

The PTO connection mechanism 100 is having three main assembly members: a frame attachment mechanism 108, a vertical moving frame (or cradle) 106, and a PTO assembly 128.

Firstly the frame attachment mechanism 108 is connected to frame of the vehicle 1000 from operative bottom surface of the frame. The frame attachment mechanism 108 remains fixedly connected to the frame. The vertical moving frame (or cradle) 106 is connected to the frame attachment mechanism 108. The vertical moving frame (or cradle) 106 is configured to move up and down with respect to the frame of the vehicle 1000. The tool 101 detachably connected to the cradle 106.

The cradle 106 comprises a first horizontal rod 106A, a second horizontal rod 106B, side links (103a, 103b), a pair of front lifting members 106C, a pair of rear lifting members 106D. The first horizontal rod 106A is configured at the operative front portion of the cradle 106 and is configured to be detachably engaged with front hooks 102A of the tool 101. The second horizontal rod 106B is configured at operative rear portion of the cradle 106 and is configured to be engaged with rotational locking plates 104D to hold the cradle 106 in a locked position with the tool 101. The pair of front lifting members 106C is pivotably connected proximal to a front end of the cradle 106. The pair of rear lifting members 106D are pivotably connected to an operative rear portion of the cradle 106.

In an embodiment, the tool 101 such as a mower deck is coupled to the frame of the utility vehicle such as a tractor 1000. In an embodiment, the utility vehicle 1000 selected is the one used for the purpose of farming, agriculture, horticulture. The tool 101 can be a mower, tillers, power tillers and the like.

A power take-off PTO connection mechanism 100 for mid mounted tools is described in detail using different figures. The power take-off PTO connection mechanism 100 includes a power take-off PTO assembly 128 connected to a movable cradle 106. The cradle 106 is configured to raise and lower the tool with respect to vehicle frame. A PTO frame 128e is configured to receive a bearing 142 which is further configured to receive a PTO shaft 144. The PTO shaft 144 is capable of sliding along the axis of the bearing 142 in accordance with the upward and downward movement of the cradle 106. An intermediate sliding member 103c is provided on a second horizontal rod 106B of the cradle 106 that is located at the rear end of the cradle 106. The intermediate sliding member 103c extends in a direction parallel to the side links 103a, 103b of the cradle 106.

Sliding blocks 150a and 150b provided on the sides of the PTO frame 128e. The sliding blocks 150a and 150b are configured to slide along sliding surfaces (B) defined on the side link 103b and the intermediate sliding member 103c of the cradle 106. A PTO coupler 146 is coupled at the operative front end of the PTO shaft 144.

A PTO locking mechanism 121 is provided for preventing the backward movement of the sliding block 150a after the PTO coupler 146 gets engaged with a tool side PTO coupler 156. The tool side PTO coupler 156 is configured to receive power from tractor side PTO coupler such as to power the tool.

The power take-off PTO connection mechanism 100 includes a push-pull rod 128b connected between the PTO frame 128e and a fixed position for rod assembly mounting (A) defined on the frame attachment mechanism 108. The push-pull rod 128b is configured to push the PTO frame 128e forward such as to make the PTO frame 128e slide along the sliding surfaces (B) when the cradle 106 is lifted up, and to apply a pull force on the PTO frame 128e when the cradle 106 is lowered.

A push/pull spring assembly 148 is configured to be pivotably coupled with the PTO frame 128e. The cradle 106 includes a PTO locking mechanism 121 that includes a restriction plate 124, a compression spring 134 and a release lever 136, said compression spring 134 configured to push the restriction plate 124 towards said intermediate sliding member 103c.

The restriction plate 124 is configured to abut the operative rear end of the left side sliding block 150a to restrict its rearward movement, when the cradle 106 is lifted up to a predetermined position.

The power take-off PTO connection mechanism 100 includes a release lever 136 connected to the restriction plate 124. The release lever 136 is capable of pulling the restriction plate 124 away from the intermediate sliding member 103c and said left side sliding block 150a to allow the rearward movement of the PTO frame 128e and de-coupling of the PTO coupler 146 from the tool side PTO coupler 156.

The release lever 136 is configured to be manually operated while disengaging the tool from the vehicle.

In an embodiment, the coupling between the cradle 106 and the frame attachment mechanism 108 is a joint coupling including a plurality of pivot joints defined by pins.

Grooves are defined in each of the sliding blocks 150a and 150b. These grooves co-operate with sliding surfaces (B) to enable linear motion of the PTO frame 128e.

In an embodiment, a removable support bracket 126 extends between the operative front end of the intermediate sliding member 103c and the side link 103a.

A first main lever 108E is configured to be pivotably coupled with the first cylindrical washer. A second main lever 108F is configured to be pivotably coupled with the second cylindrical washer. Each of the front brackets 108G is pivotably coupled to one end of a first carrier links 108A via a first front lever and a second front lever. Each of the front brackets 108G is configured to be fastened to the utility vehicle to support the PTO connection mechanism 100 to the frame of the vehicle 1000. The intermediate pull rods 111, 113, and the first and second main levers 108E, 108F are in pivotal relationship to turn and pull the front levers, respectively. The rear brackets 108H along with the turning brackets 108L are coupled at the other end of each of the first carrier link 108A and second carrier links 108B, respectively. A first pull rod 108J and a second pull rod 108K are configured to be pivotably coupled between each of the first main lever 108E, the second main lever 108F, the rear brackets 108H respectively via the first washer and the second washer. In an embodiment, the entire components of the frame attachment mechanism 108 are fastened via washers, bolts and nuts, and spring pin.

The power take-off (PTO) connection mechanism 100 is coupled to the rear portion of the cradle 106 and is supported by the second horizontal rod 106B. The PTO connection mechanism 100 facilitates power transmission from the utility vehicle 1000 to the tool 101. More particularly, the PTO assembly 128 powers the cutters and wheels of the tool 101. The PTO connection mechanism 100 includes a housing 140, a PTO shaft 144, a PTO coupler 146, a push/pull spring assembly 148, sliding blocks (150a and 150b) and a cover plate 152.

In an embodiment, the frame attachment mechanism 108 (fixed frame) is a part of tractor or utility vehicle which has fixed position for rod assembly mounting.

Figure 3:
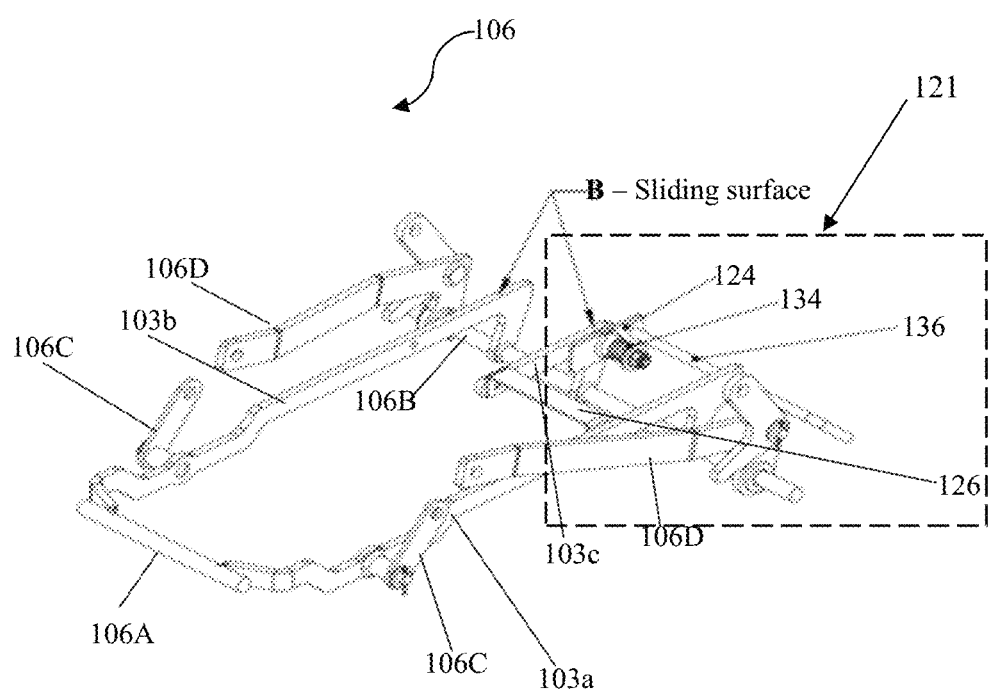
FIG. 3 illustrates an isometric view of a vertical moving frame.
Figure 4:
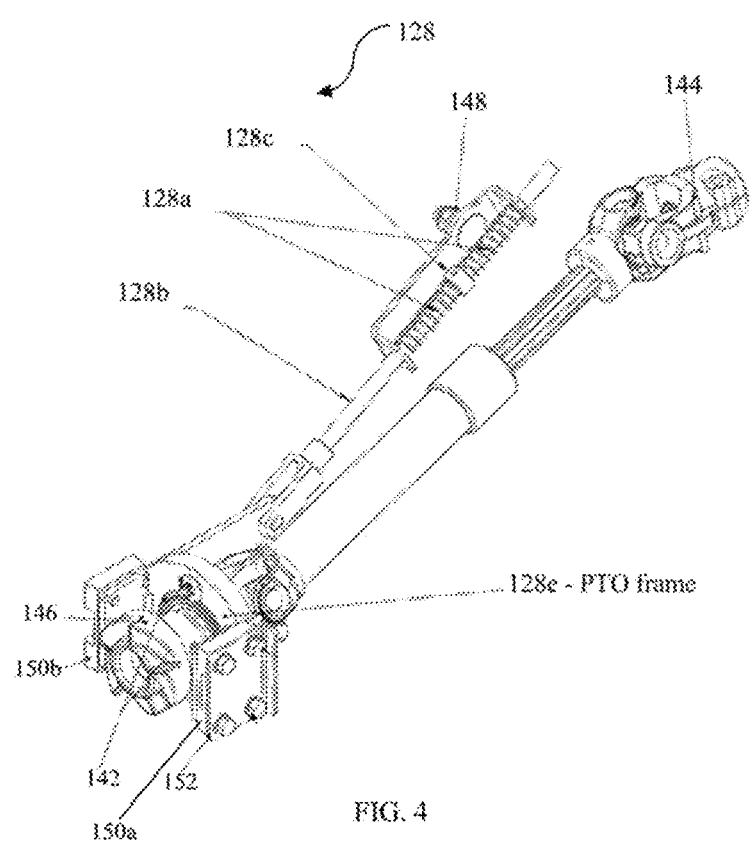
FIG. 4 illustrates an isometric view of a power take-off (PTO) connection mechanism.
Figure 5:
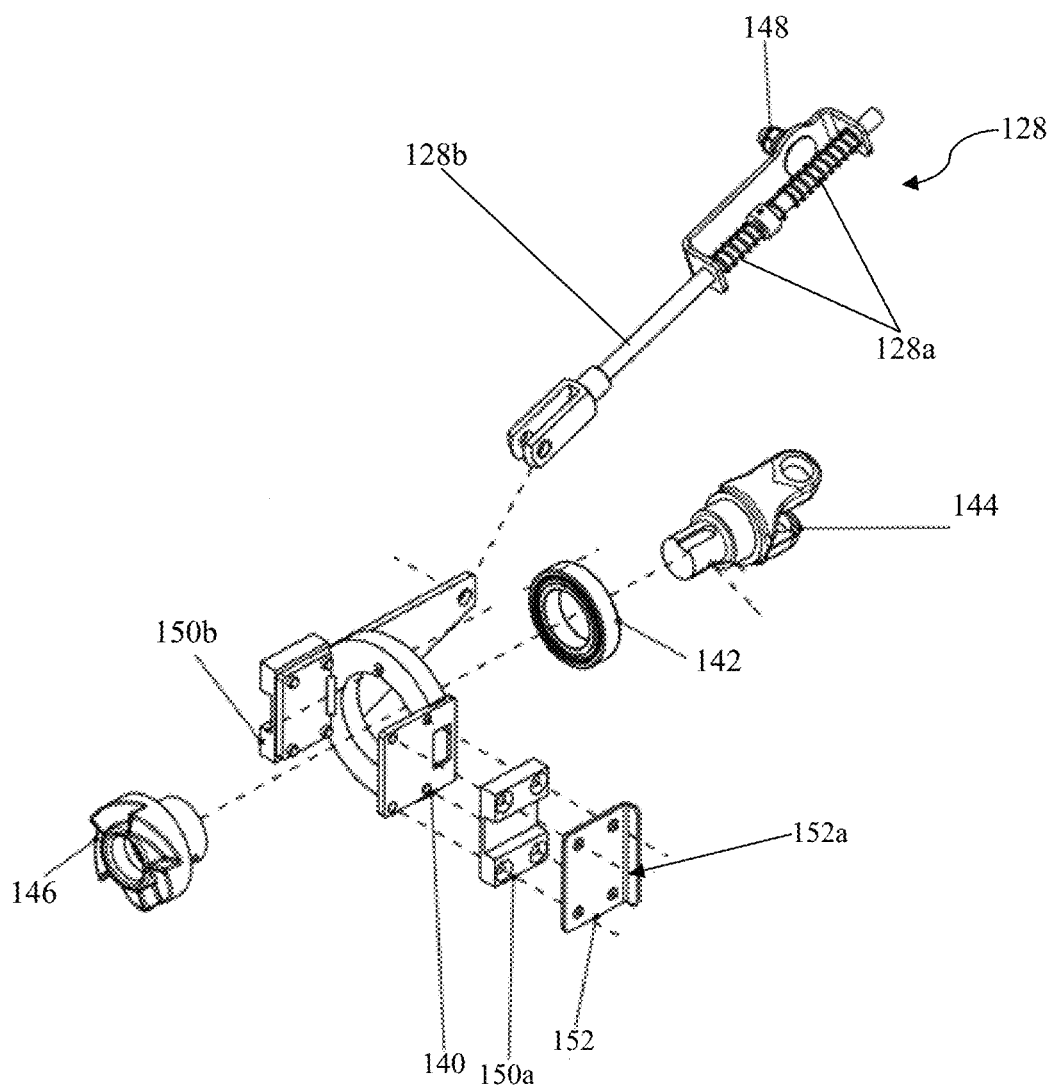
FIG. 5 illustrates an exploded view of the power take-off (PTO) connection mechanism of FIG. 4.
Figure 6:
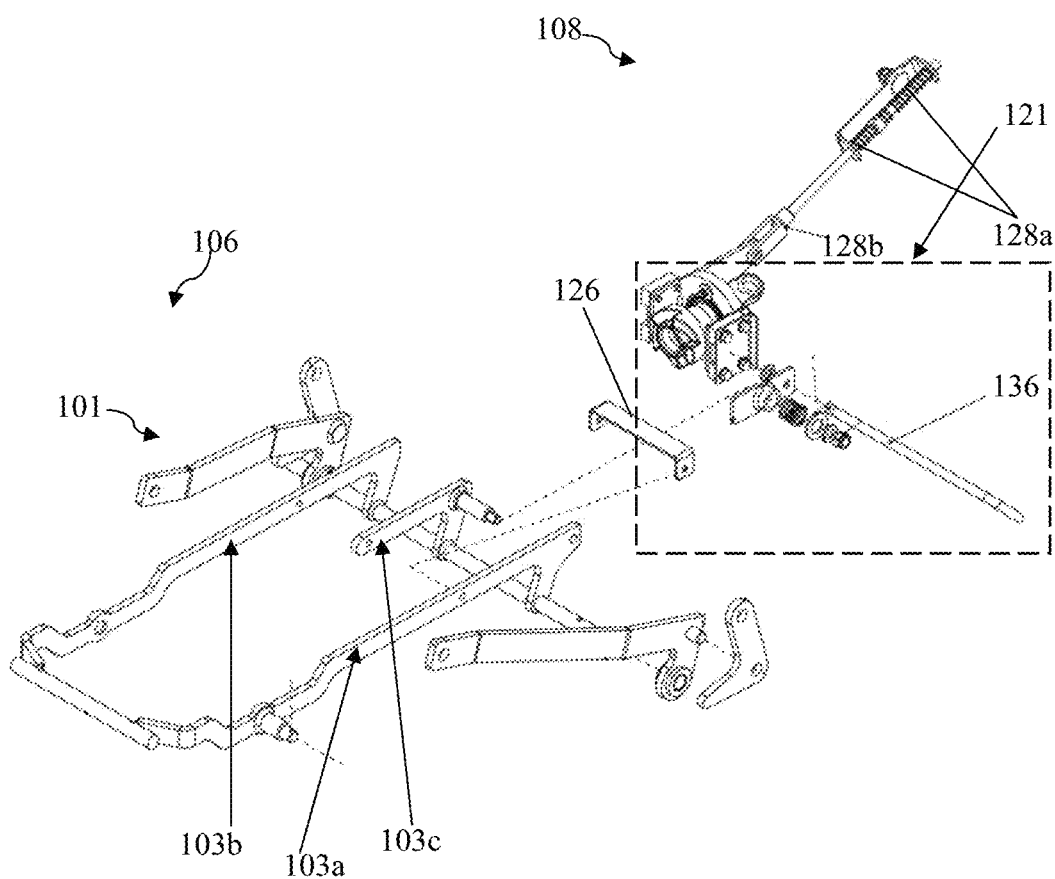
FIG. 6 illustrates the quick power take-off (PTO) connection mechanism of FIG. 1 separated from each other.
Figure 7:
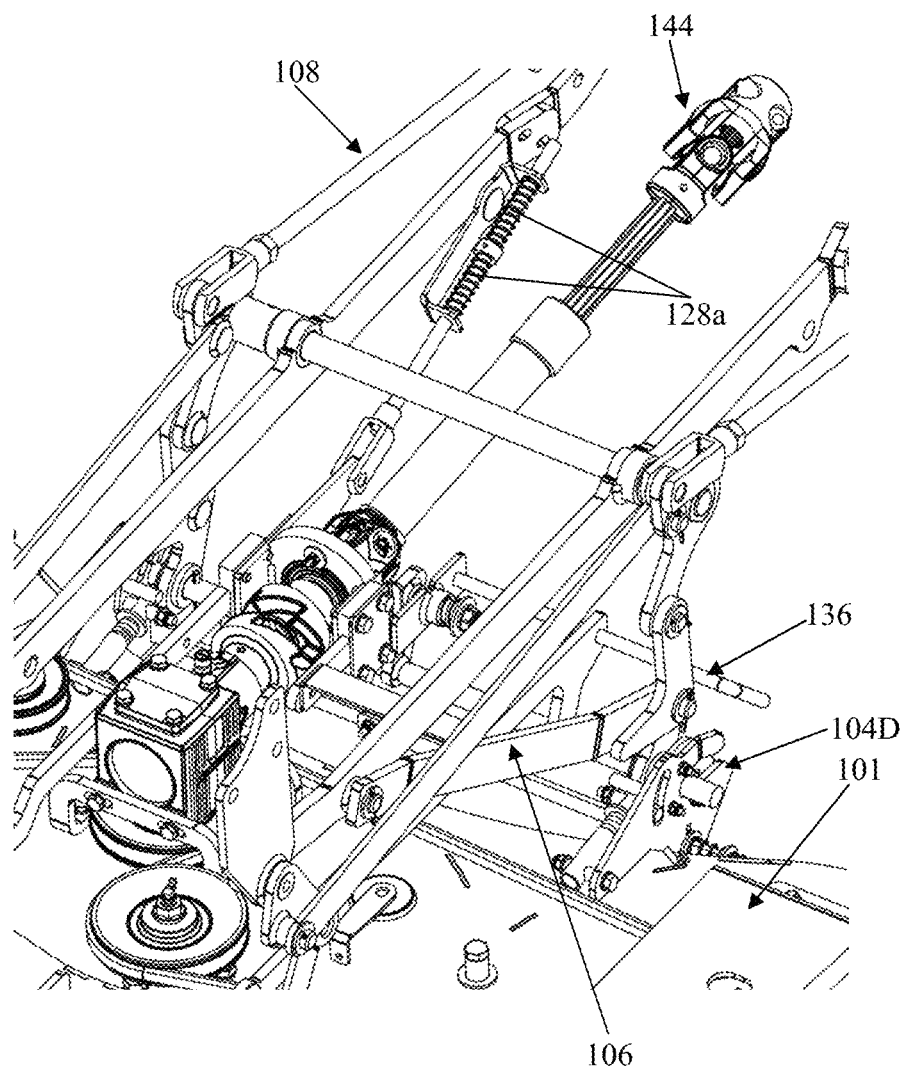
FIG. 7 illustrates an isometric view of a power take-off (PTO) assembly in a disengaged state.
Figure 8:
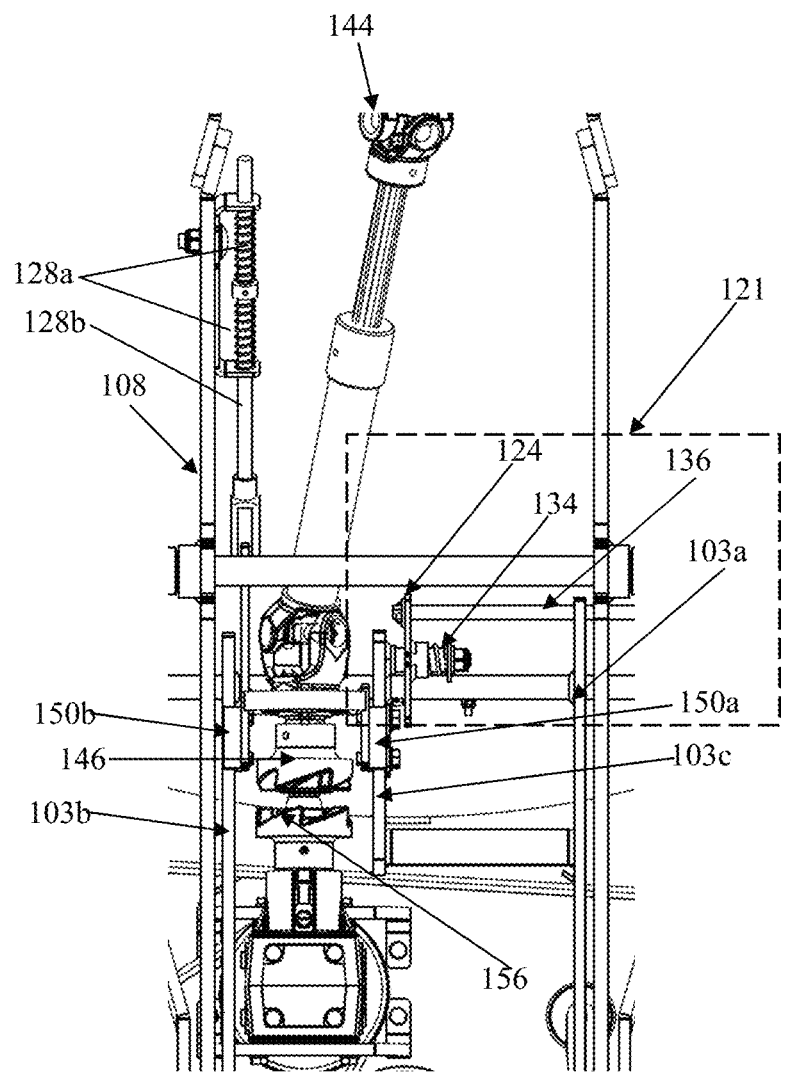
FIG. 8 illustrates a top view of a power take-off (PTO) assembly of FIG. 6.
Figure 9:
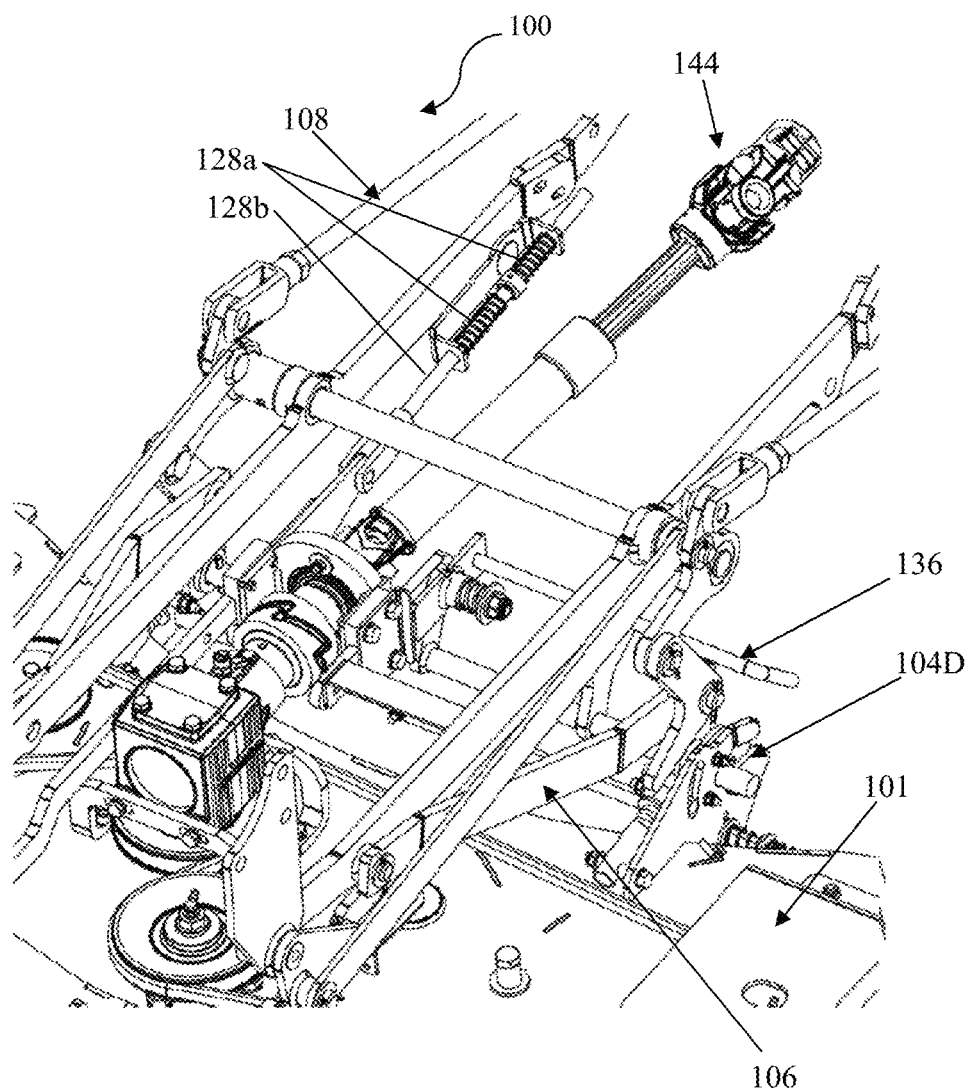
FIG. 9 illustrates an isometric view of a power take-off (PTO) assembly in an engaged state.
Figure 10:
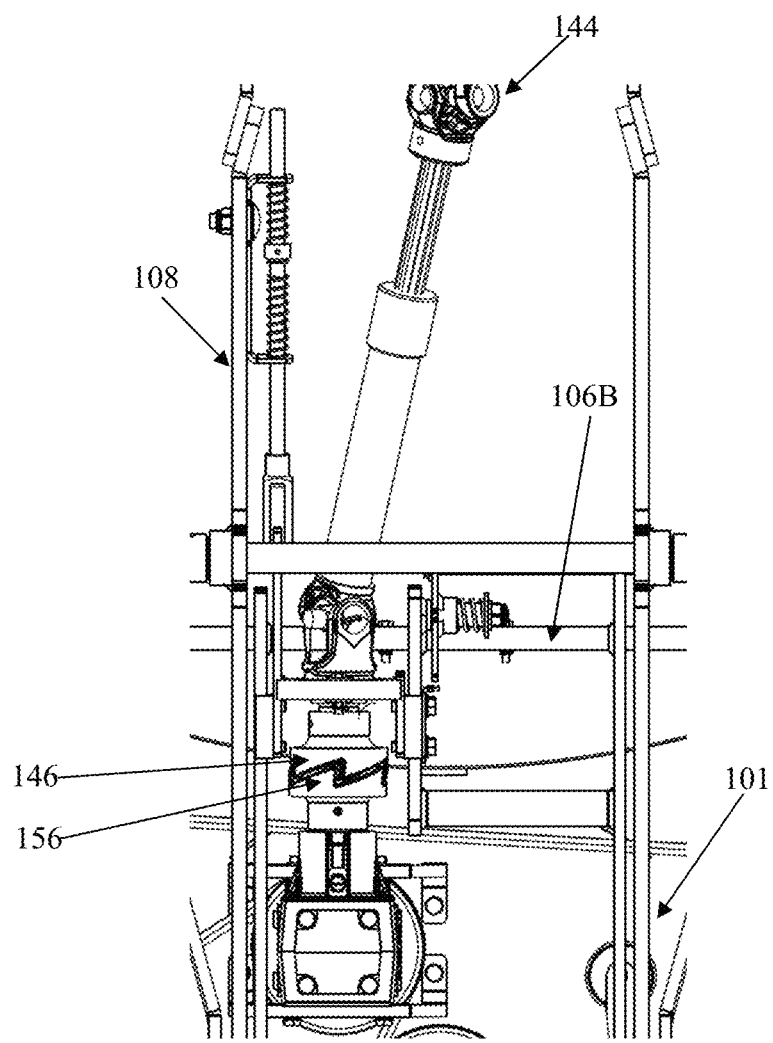
FIG. 10 illustrates a top view of a power take-off (PTO) assembly of FIG. 9.
Figure 11:
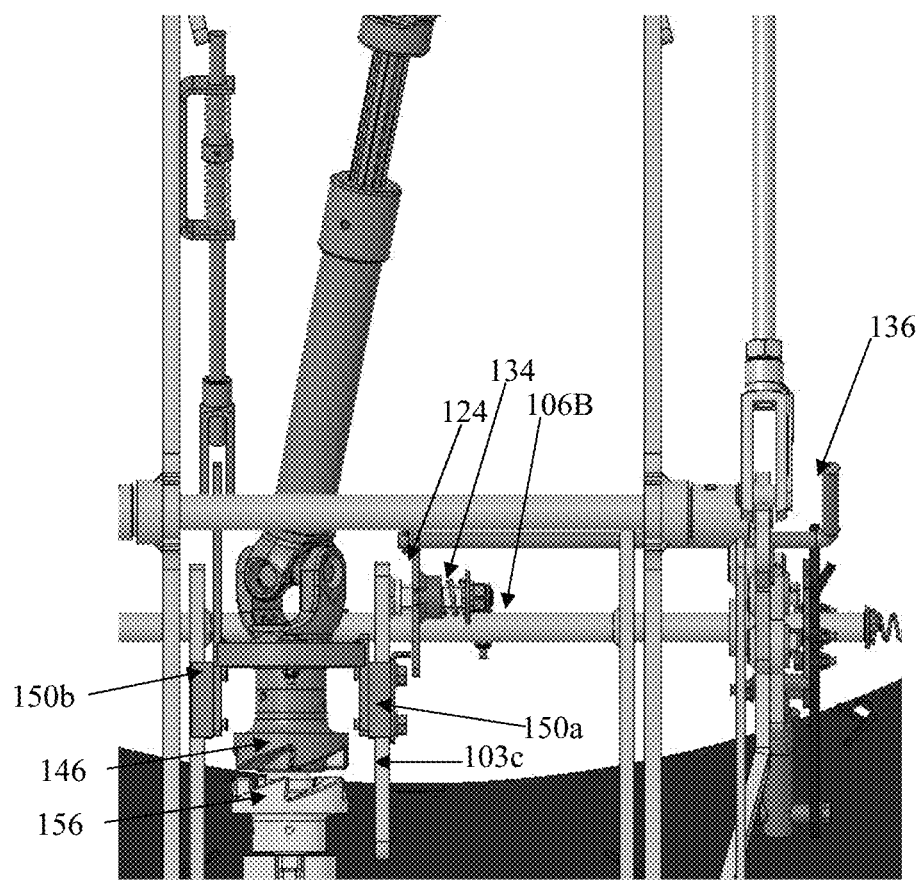
FIG. 11 illustrates a top view of a power take-off (PTO) assembly in a disengaged position.
Figure 12:
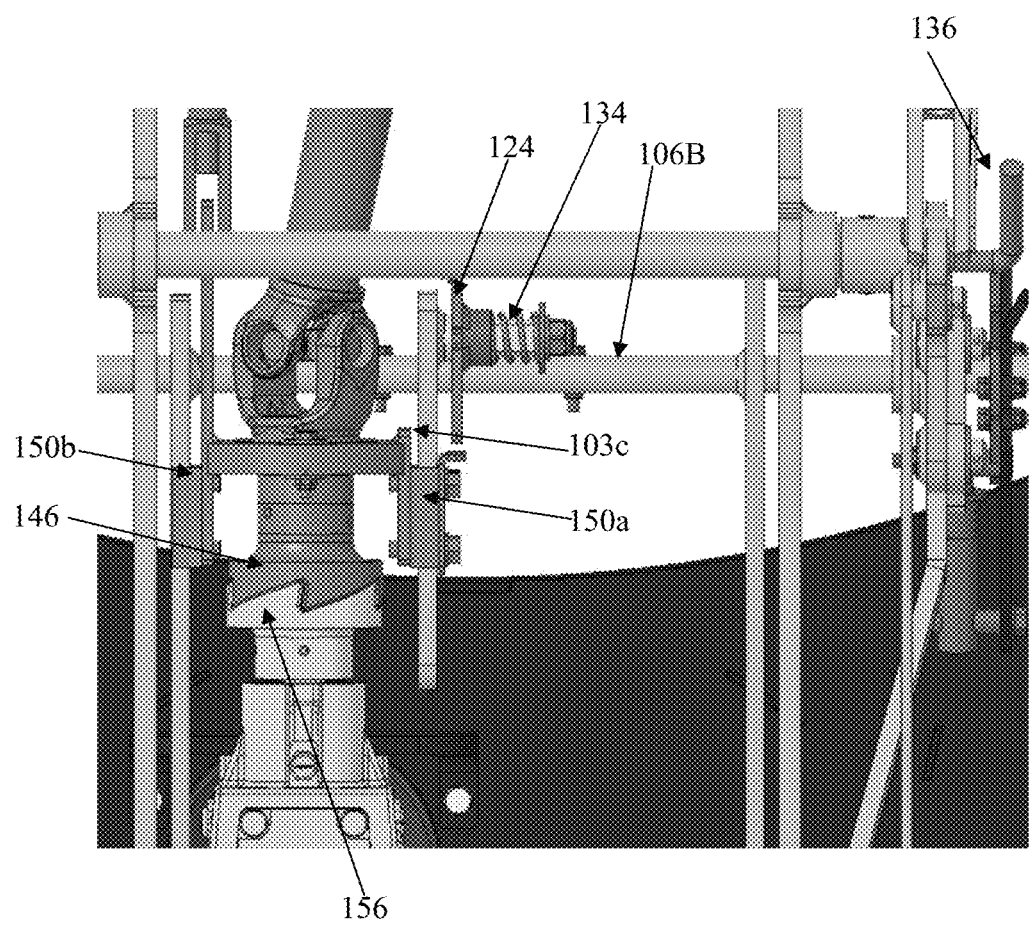
FIG. 12 illustrates a top view of a power take-off (PTO) assembly in an engaged position.
Figure 13:
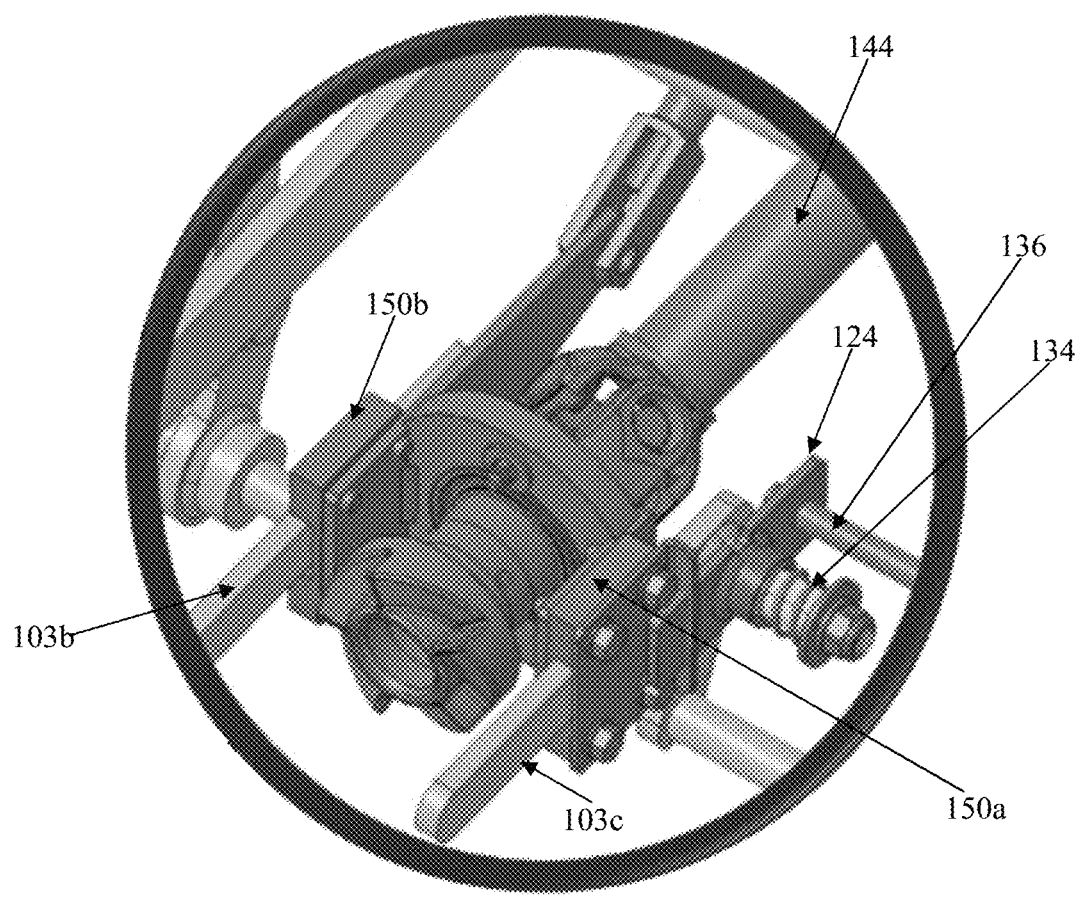
FIG. 13 illustrates a zoomed in view of the power take-off (PTO) assembly in an engaged position.
Figure 14:
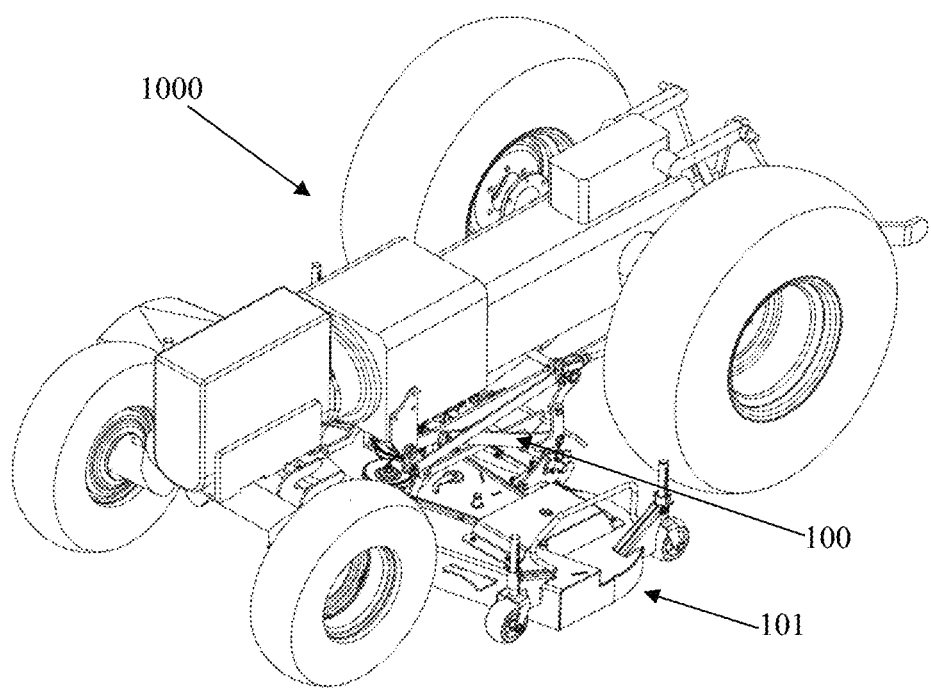
FIG. 14 illustrates an isometric view of the tool coupled to the frame of a tractor/utility vehicle.

The cradle (vertical moving frame) 106 as shown in FIG. 3 is an assembly which is able to move in vertical direction when compared to the frame attachment mechanism 108. The cradle 106 has assembled thereon the PTO locking mechanism 121 which includes the restriction plate 124, the compression spring 134 and a release lever 136. The compression spring 134 is configured to push the restriction plate 124 towards operative left side sliding surfaces (B). The release lever 136 is a part which moves the restriction plate 124 away from the left sliding surfaces member (B) when pulled.

PTO connection parts are installed so that a joint connection (bearing) connected to a fixed position for rod assembly mounting (A). The bearing is configured to rotate freely. The PTO frame 128e is fastened into a vertical moving frame so that the sliding blocks 150a, 150b can move on the sliding surfaces (B). Installation can be seen in FIG. 7 through FIG. 10. By virtue of this installation the PTO end moves along the sliding surfaces (B) during vertical movement of the cradle 106.

Once the PTO is locked and when the cradle 106 is moving vertically the push/pull rod 128b along with a centering spring 128a allows the PTO shaft stay engaged with the power input of the tool 101. A locked sleeve 128c is also provided between the centering springs 128a.

The PTO connection mechanism is suitable for mid mounted tools of a utility vehicle. A mechanism is provided for converting the vertical movement of the cradle to a horizontal (forward/backward) movement of PTO engagement and dis-engagement.

The push pull spring assembly provides the force for engagement through spring. As a result some flexibility is provided in the engagement of PTO, for example when a PTO coupler 146 and the tool side PTO coupler 156 are not engaged properly.

When PTO is in engaged state and locked, the push/pull spring assembly will be pulling when tool is lowered. The fork head side spring will be compressed upon lowering of tool. If release applied in low position of tool, the PTO will disengage with the pull force of push/pull spring assembly.

Automatic PTO engaging and disengaging mechanism for a mid-mounted implement to tractor or utility vehicle by vertical movement of the implement when compared to tractor or utility vehicle.

Spring system allowing the PTO coupling to stay engaged while lifting and lowering the implement.

Thus, the PTO connection mechanism 100 facilitates easy coupling of the tool 101 such as the mower deck with the frame of the utility vehicle 1000 in less amount of time and with less efforts as compared to the conventional mechanisms.

Easier and faster PTO engaging and disengaging is achieved at the for customer's end. A push-pull spring assembly provides the force for engagement through the centering springs 128a to offer some flexibility of PTO engagement initially when the coupler is not engaged properly.

Once the PTO is engaged and locked, the push/pull spring assembly is configured to a pulling force when the tool is lowered.

The fork-head side centering spring 128a is compressed upon lowering of tool and after the release lever 136 is actuated in a lowered position of the tool, the PTO will disengage with the pull force of push/pull spring assembly.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS AND ECONOMICAL SIGNIFICANCE

The present disclosure described herein above has several technical advantages including, but not limited to, the realization of a power take-off (PTO) connection mechanism for mid mounted tools of a utility vehicle, that:

helps in maintaining continuous connection of the PTO shaft and power input of a tool;

can be adapted to suit different types of tools;

enables easy coupling of tool with the frame of the utility vehicle; and facilitates quick coupling of the PTO shaft to a tool.

The embodiments herein, the various features, and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A power take-off (PTO) connection mechanism for mid mounted tools of a utility vehicle, said PTO connection mechanism comprising:

a power take-off (PTO) assembly connected to a movable cradle;

a PTO frame configured to receive a bearing, said bearing configured to receive a PTO shaft, said PTO shaft capable of sliding along an axis of said bearing in relation to an upward and downward movements of said cradle;

an intermediate sliding member provided on a rear rod of said cradle and extending in a direction parallel to side links of said cradle;

sliding blocks provided on said PTO frame, said sliding blocks configured to slide along sliding surfaces defined on said side links and said intermediate sliding member of said cradle;

a PTO coupler coupled at an operative front end of said PTO shaft; and a PTO locking mechanism for preventing a backward movement of said sliding blocks after said PTO coupler gets engaged with a tool side PTO coupler, wherein said power take-off (PTO) connection mechanism includes a push-pull rod connected between said PTO frame and a fixed position for rod assembly mounting defined on a frame attachment mechanism fastened to said PTO frame of said utility vehicle, said push-pull rod configured to push said PTO frame forward to make it slide along said sliding surfaces when said cradle is lifted up and to apply a pull force on said PTO frame when said cradle is lowered, said power take-off (PTO) connection mechanism further includes a push/pull spring assembly configured to be pivotably coupled with said PTO frame.

2. The power take-off (PTO) connection mechanism as claimed in claim 1, wherein said PTO locking mechanism includes a restriction plate, a compression spring and a release lever, said compression spring configured to push said restriction plate towards said intermediate sliding member.

3. The power take-off (PTO) connection mechanism as claimed in claim 2, wherein said restriction plate of said PTO locking mechanism is configured to abut an operative rear end of a left sliding block to restrict its rearward movement, when said cradle is lifted up to a predetermined position and when said PTO assembly is engaged.

4. The power take-off (PTO) connection mechanism as claimed in claim 3, wherein said release lever of said PTO locking mechanism is connected to said restriction plate and is capable of pulling said restriction plate away from the intermediate sliding member and said left sliding block to allow the rearward movement of said PTO frame and thereby facilitate de-coupling of said PTO coupler from the tool side PTO coupler.

5. The power take-off (PTO) connection mechanism as claimed in claim 4, wherein said release lever is configured to be manually operated while disengaging one of said tools from said utility vehicle.

6. The power take-off (PTO) connection mechanism as claimed in claim 1, wherein coupling between said cradle and said frame attachment mechanism is a joint coupling including a plurality of pivot joints defined by pins.

7. The power take-off (PTO) connection mechanism as claimed in claim 1, wherein in each of said sliding blocks, grooves are defined to co-operate with the sliding surfaces.

8. The power take-off (PTO) connection mechanism as claimed in claim 1, wherein a mechanism is provided for converting a vertical movement of said cradle to a horizontal movement of PTO engagement and dis-engagement, the horizontal movement being forward and backward movement.

9. The power take-off (PTO) connection mechanism as claimed in claim 1, wherein a push-pull spring assembly provides a force for engagement through a centering springs, to offer some flexibility of PTO engagement initially when the coupler is not engaged properly, and once PTO is engaged and locked, said push/pull spring assembly is configured to apply a pulling force when one of said tools is lowered.

10. The power take-off (PTO) connection mechanism as claimed in claim 1, wherein a fork-head side centering spring is compressed upon lowering of one of said tools and after a release lever is actuated in a lowered position of one of said tools, the PTO will disengage with a pull force of said push/pull spring assembly.

11. The power take-off (PTO) connection mechanism as claimed in claim 1, wherein a support bracket is fastened at an operative front end of said intermediate sliding member, said support bracket configured to prevent said sliding blocks of the PTO assembly from coming out of said intermediate sliding member.

* * * * *